US012785017B1

(12) United States Patent
Patel et al.

(10) Patent No.: US 12,785,017 B1
(45) Date of Patent: Nov. 3, 2026

(54) CIRCUIT BREAKER DEVICE WITH THREE-POSITION ACTUATOR

(71) Applicant: AMAZON TECHNOLOGIES, INC., Seattle, WA (US)

(72) Inventors: Jiger Patel, San Jose, CA (US); Troy Herndon, San Jose, CA (US); Emilio Molina Reyes, San Jose, CA (US); Joshua Lamar Suttle, Oakland, CA (US); Christopher Buonomo, San Jose, CA (US); Amirhossein Samakar, Fremont, CA (US); Simraan Alok Gole, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 601 days.

(21) Appl. No.: 18/189,416

(22) Filed: Mar. 24, 2023

Related U.S. Application Data

(60) Provisional application No. 63/481,240, filed on Jan. 24, 2023.

(51) Int. Cl.
*H01H 47/22* (2006.01)
*H01H 50/14* (2006.01)
(Continued)

(52) U.S. Cl.
CPC ............ *H01H 47/22* (2013.01); *H01H 50/14* (2013.01); *H01H 50/44* (2013.01); *H01H 50/54* (2013.01)

(58) Field of Classification Search
CPC ............................. H01H 71/128; H01H 50/54
(Continued)

(56) References Cited

U.S. PATENT DOCUMENTS 723,119 A * 3/1903 Zweigbergk ........... H01H 50/20 200/16 R
2,795,669 A * 6/1957 Campbell .............. H01H 51/04 335/203
(Continued)

OTHER PUBLICATIONS

"Instructions for Installation of 120 and 240 Vac Electrical (Solenoid) Operator on J-Frame and K-Frame Series C Circuit Breakers and Molded Case Switches", Eaton Cutler-Hammer, 12 pages. Retrieved from the Internet on Oct. 22, 2020. URL: https://www.eaton.com/content/dam/eaton/products/electrical-circuit-protection/molded-case-circuit-breakers/series-c-molded-case-circuit-breakers/j-k-electrical-operator-il29c202h.PDF.
(Continued)

*Primary Examiner* — Alexander Talpalatski
(74) *Attorney, Agent, or Firm* — Athorus, PLLC

(57) ABSTRACT

A circuit breaker device is used to control flow of electrical power from a first terminal that connects to a power source to a second terminal that connects to a load. A solenoid or other type of actuator within the circuit breaker device is used to operate mechanical switches to control the flow of electrical power. When the solenoid is in a central position, electrical power is able to flow across the device. When the solenoid is moved to a first position, such as in response to a fault, the solenoid activates a trip mechanism that opens a first switch to disconnect the first terminal from the second. The solenoid may also be moved to a second position that opens a spring biased switch comprising electrical contacts, disconnecting the first terminal from the second without opening the first switch or activating the trip mechanism.

20 Claims, 9 Drawing Sheets

(51) Int. Cl.
*H01H 50/44* (2006.01)
*H01H 50/54* (2006.01)

(58) Field of Classification Search
USPC .................................................... 335/18–21
See application file for complete search history.

(56) References Cited

U.S. PATENT DOCUMENTS

| | | | | | |
|---|---|---|---|---|---|
| 2,895,090 | A * | 7/1959 | Short | H01F 7/1607 | 188/161 |
| 5,381,121 | A * | 1/1995 | Peter | H01H 71/68 | 335/14 |
| 6,570,269 | B2 * | 5/2003 | McMillan | H01H 89/06 | 307/64 |
| 6,714,108 | B1 * | 3/2004 | Simms | H01H 3/001 | 200/DIG. 42 |
| 6,724,284 | B2 * | 4/2004 | Simms | H01H 71/46 | 335/14 |
| 6,801,109 | B2 * | 10/2004 | Simms | H01H 89/06 | 335/14 |
| 6,861,930 | B2 * | 3/2005 | Simms | H01H 71/46 | 335/14 |
| 8,688,391 | B2 * | 4/2014 | Elsner | H01H 1/0015 | 702/34 |
| 8,729,984 | B2 * | 5/2014 | Feller | H01H 71/2463 | 335/184 |
| 9,013,256 | B2 * | 4/2015 | Simonin | H01H 71/2481 | 335/256 |
| 10,984,974 | B2 * | 4/2021 | Mittelstadt, I | H01H 71/0207 | |

OTHER PUBLICATIONS

"Three-Position Push Pull Solenoid", Wikipédia, 16 pages. 2023. URL: http://en.wikipedia.org/wiki/Document_Object_Model. Downloaded from the Internet: https://www.tlxtech.com/solutions/three-position-push-pull-solenoid.

* cited by examiner

Time = T4 (energize coil to remove armature from latching mechanism)

Time = T5 (energize second coil to limit movement of armature past neutral position)

600

TIME = T3
(CEASE ENERGIZING COIL OR REDUCE/REVERSE ENERGY TO COIL; BIASING MEMBER AND/OR COIL BEGIN TO RETURN ARMATURE TO NEUTRAL POSITION)

TIME = T4
(ENERGIZE ONE OR BOTH COILS TO LIMIT MOVEMENT OF ARMATURE PAST NEUTRAL POSITION)

CIRCUIT BREAKER DEVICE WITH THREE-POSITION ACTUATOR

PRIORITY

This application claims priority to U.S. Patent Application Ser. No. 63/481,240 filed on Jan. 24, 2023, titled "Electrical Circuit Breaker Apparatus with Integrated Actuator", the contents of which are incorporated by reference into the present disclosure.

BACKGROUND

Electrical faults or other undesired or suboptimal conditions related to the provision of electrical power may cause damage to property or people, excessive use of resources, strain on infrastructure, and so forth. Some types of circuitry or devices, such as circuit breakers, may be used to prevent the flow of electrical power under certain potentially dangerous conditions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
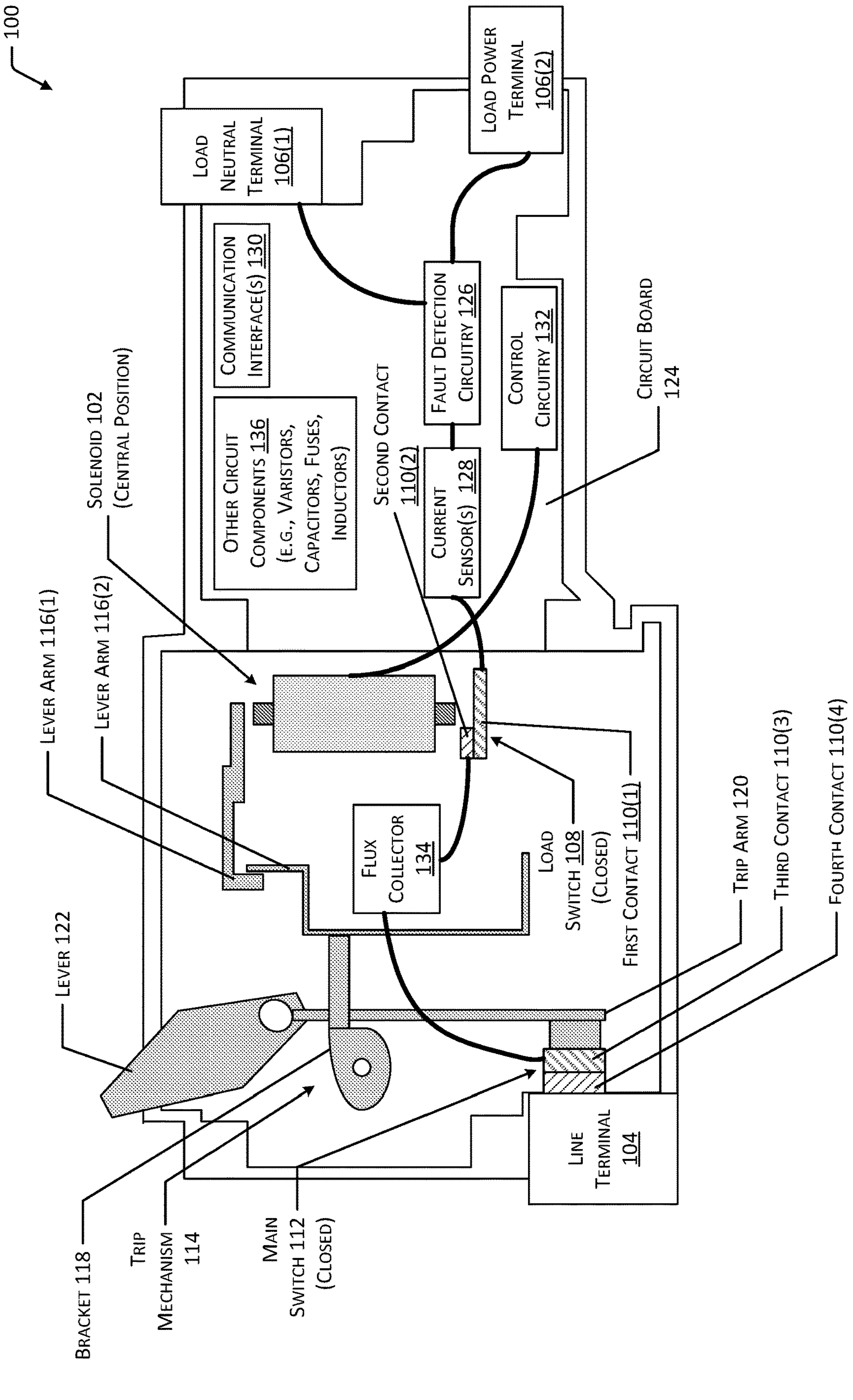
FIG. 1 is a diagram depicting an implementation of a circuit breaker device having a solenoid that controls operation of switches within the device, with the solenoid in a central position that does not transition the switches from closed to open positions.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Electrical power, such as alternating current (A/C), is distributed from a source, via electrical mains, into distribution panels (e.g., circuits), which may be found in homes, businesses, or other structures, facilities, or devices that use electrical power. Branch circuits connected to a distribution panel may conduct electrical power to loads. For example, one or more electrical outlets may be connected to a branch circuit, and one or more electrical devices, such as an appliance, may be engaged with the electrical outlet to receive electrical power from the A/C source via the branch circuit.

A branch circuit may be connected to the distribution panel via a circuit breaker. Circuit breakers, or other current-limiting or protective equipment, are used to electrically disconnect a branch circuit from a distribution panel under potentially dangerous conditions, such as if the transfer of electrical current to a branch circuit exceeds a threshold amount. For example, a circuit breaker may enter a "tripped" state that disconnects the branch circuit, and any connected loads, from the distribution panel.

Other types of protective devices may be used to determine various types of faults associated with the flow of electrical power. For example, a ground fault circuit interrupter (GFCI) may determine a current imbalance between conductors in a circuit that may be associated with a potentially dangerous path to electrical grounds. If such a fault is determined, the GFCI may disconnect the branch circuit and associated loads from the distribution panel. An arc fault circuit interrupter (AFCI) may determine an electrical arc on a branch circuit based on determined voltage and current delivered to the branch circuit.

In some cases, conventional circuit breakers may react slowly in response to the transfer of a large amount of current, permitting a substantial and potentially dangerous transfer of energy before the circuit breaker enters the tripped state. Conventional GFCIs are limited to detection of ground faults and may fail to determine the occurrence of arc faults or other types of undesired events. In some cases, conventional AFCIs are subject to erroneous detection of faults that have not occurred and may place a circuit into a tripped state in such a case, preventing use of the associated branch circuit. Each type of protective device is reliant upon the accuracy of the device's ability to correctly detect a threshold circumstance to automatically place a branch circuit into a tripped state and must typically be manually reset from the tripped state. Additionally, placing a branch circuit into a tripped or disconnected state in the absence of detected conditions that cause this to automatically occur typically requires the presence of an operator to physically manipulate one or more components of the branch circuit.

Described in this disclosure is an electrical circuit breaker device that is able to automatically enter a tripped state upon detection of a fault, high current, or other conditions. The circuit breaker device may also be controlled remotely to enter a tripped state, or to enter an alternate disconnected state where the load is disconnected without placing the device into a tripped state. A circuit breaker device comprises a line terminal, a main switch, a load switch, and a load terminal in series. A single integrated actuator, such as a solenoid having a movable armature, or another type of actuator having a movable element, may be placed in three different positions to operate these switches and control the flow of electrical power between the line terminal and the load terminal. In other implementations, other types of actuators such as an electromagnet that interacts with ferrous or magnetic elements to move the elements or retain the elements in a selected position, or a shape memory alloy that changes shape in response to temperature, may be used to operate switches.

When the armature moves to a first position, a first electrical contact of the load switch is separated from a second electrical contact of the load switch to open the switch and electrically disconnect the load terminal from the line terminal. For example, an end of an armature may move one of the two electrical contacts away from the other and maintain a space between the electrical contacts until moved away from the first position. Continuing the example, one or both of the contacts may be biased to move toward one another to close the load switch, while the armature in the first position maintains the load switch in an open position. In some implementations, the solenoid may include a latching mechanism, such as a magnet, to retain the armature in the first position when current applied to move the armature to the first position is ceased. An opposing current may be applied to disengage the armature from the latching mechanism and return the armature to a central position that permits the flow of electrical power through the circuit breaker device. In some implementations, to prevent the solenoid from moving a significant distance past the central position, current may be applied to a second electrical coil to apply a force toward the first position that slows the rate of movement of the armature toward the central position. In some implementations, the armature may move to the first position responsive to a command to cause opening of the load switch. The command may be determined internally to the apparatus, such as by sensors or circuitry that determine a threshold condition such as high current, or received from an external source such a wireless command from a computing device received via a communication interface. In other implementations, one or both of the electrical contacts of the load switch may be biased toward an open position, such that the line terminal remains electrically disconnected from the load terminal until the load switch is closed using the solenoid or other type of actuator having a movable element. For example, an end of the armature may move one of the electrical contacts toward the other and may maintain the load switch in a closed position until the armature is removed from contact with the load switch.

When the armature is moved to a second position, a third electrical contact of the main switch is separated from a fourth electrical contact of the main switch to open the switch and electrically disconnect the load terminal from the line terminal. For example, an end of the armature may cause a trip mechanism to switch from a closed position to an open position that separates the third electrical contact from the fourth electrical contact. In some implementations, one or more sensors of the circuit breaker device may be configured to detect a fault such as a ground fault, arc fault, overload, short circuit, and so forth. The armature may move to the second position responsive to the fault to transition a trip mechanism from a closed position to an open or tripped position that opens the main switch and electrically disconnects the load terminal from the line terminal. In some implementations, an external mechanical input may be required to close the main switch, such as by resetting the trip mechanism after the device enters a tripped state. For example, a spring or other type of biasing member, or in some cases, a current applied to an electrical coil, may return the solenoid to a central position from the second position, however the circuit breaker device may remain in the tripped state after the solenoid has been returned to the central position. In some implementations, to prevent the solenoid from moving a significant distance past the central position toward the first position, current may be applied to a second electrical coil to apply a force toward the second position that slows the rate of movement of the solenoid toward the central position.

When the solenoid is placed in a third position, which in some implementations may be between the first and second positions, the conduction of electrical power from the line terminal to the load terminal may occur normally. For example, when the solenoid is in the third position, the circuit breaker device is in a closed state, the armature of the solenoid does not open the load switch or the main switch, and electrical power is conducted across the device to energize a load.

FIG. 1 is a diagram 100 depicting an implementation of a circuit breaker device having a solenoid 102 that controls operation of switches within the device, with the solenoid 102 in a central position that does not transition the switches from closed to open positions. The device may include a line terminal 104 that receives electrical power from a power source, such as A/C electrical mains. The device may also include one or more load terminals 106, which may connect to a load to enable electrical power to flow from the line terminal 104, through the circuit breaker device, to the load terminals 106, to energize the load. For example, a load terminal 106 may be coupled to an electrical outlet that is coupled to an appliance or other type of electrical device. FIG. 1 depicts the circuit breaker device including a load neutral terminal 106(1) and a load power terminal 106(2).

The circuit breaker device may include two or more switches connected in series between the line terminal 104 and load power terminal 106(2). For example, FIG. 1 depicts a load switch 108 that includes a first contact 110(1) and a second contact 110(2). The first contact 110(1) is connected to the load terminal(s) 104, while the second contact 110(2) is connected to a main switch 112 that is in turn connected to the line terminal 104. When the load switch 108 is in a closed position that permits electrical power to flow from the line terminal 104 to the load power terminal 106(2), the first contact 110(1) and the second contact 110(2) are in contact with one another. To prevent the flow of electrical power and electrically disconnect the load power terminal 106(2) from the line terminal 104, the load switch 108 may be opened by moving at least one of the first contact 110(1) or the second contact 110(2) away from the other of the first contact 110(1) or second contact 110(2). For example, the first contact 110(1) may be movable relative to the second contact 110(2) (e.g., away from the second contact 110(2)) to open the load switch 108. In other implementations, the second contact 110(2) may be movable relative to the first contact 110(1). In still other implementations, both the first contact 110(1) and the second contact 110(2) may be movable. The load switch 108 may be biased toward the closed position. For example, a spring or other biasing member may be used to apply a force that moves the first contact 110(1) toward the second contact 110(2) in the absence of other forces applied to the first contact 110(1). The solenoid 102 may be used to apply a force to the first contact 110(1) to open the load switch 108, as described with regard to FIG. 2. In other implementations, the load switch 108 may be biased toward the open position, and the solenoid 102 may be used to apply a force to one of the first contact 110(1) or the second contact 110(2) to close the load switch 108.

Figure 3:
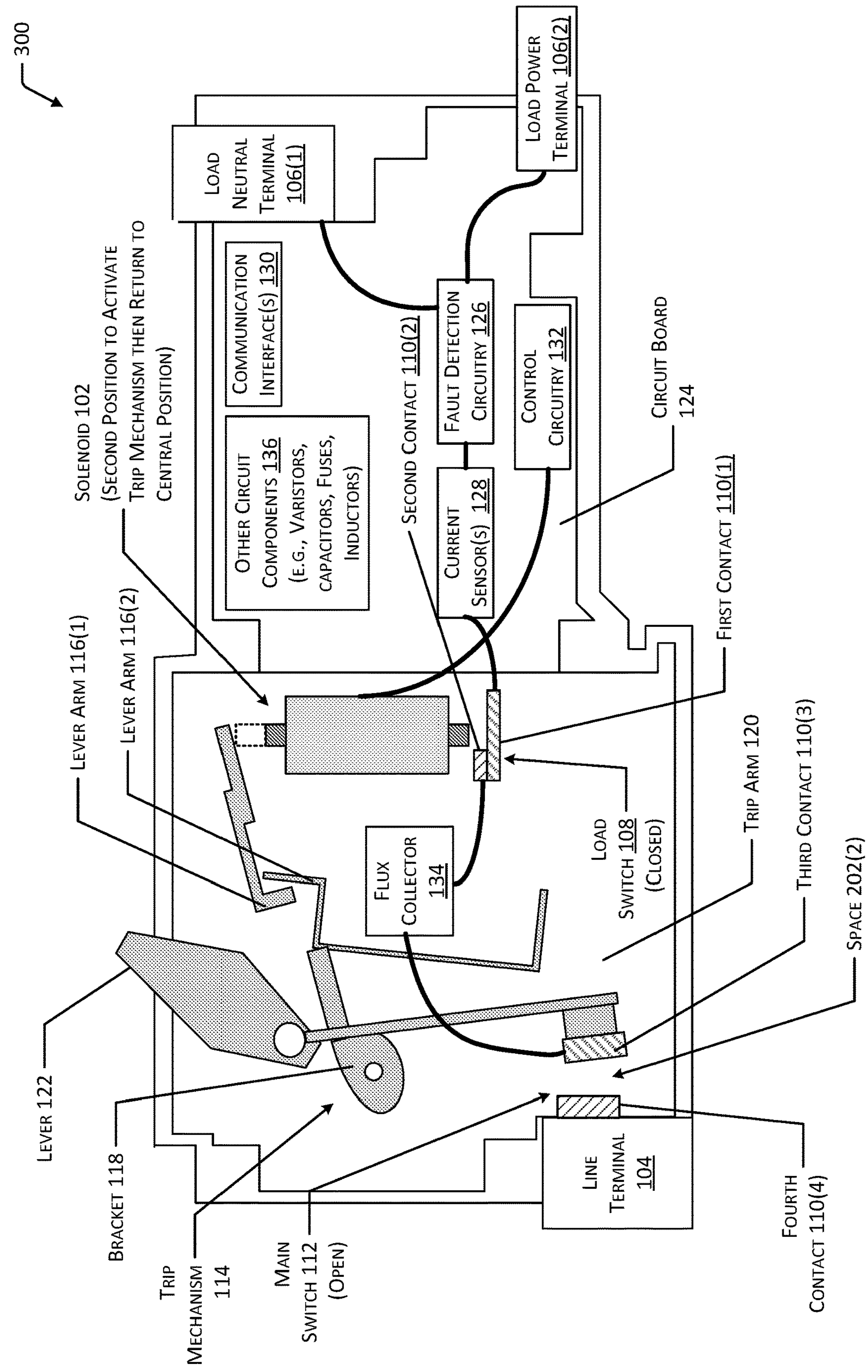
FIG. 3 is a diagram depicting the circuit breaker device of FIG. 1, with the solenoid in a second position that activates a trip mechanism to open a main switch within the device.

As described previously, FIG. 1 also depicts a main switch 112 connected in series with the line terminal 104, the load contact switch 108, and the load power terminal 106(2). The main switch 112 includes a third contact 110(3) connected to the second contact 110(2) of the load switch 108, and a fourth contact 110(4) connected to the line terminal 104. When the main switch 112 is in a closed position that permits electrical power to flow from the line terminal 104 to the load power terminal 106(2), the third contact 110(3) and the fourth contact 110(4) are in contact with one another. To prevent the flow of electrical power and electrically disconnect the load power terminal 106(2) from the line terminal 104, the main switch 112 may be opened by moving at least one of the third contact 110(3) or the fourth contact 110(4) away from the other of the third contact 110(3) or fourth contact 110(4). For example, FIG. 1 depicts the third contact 110(3) associated with a trip mechanism 114. The trip mechanism 114 may be movable between a closed state, as shown in FIG. 1, in which the main switch 112 is in a closed position, to an open state, as shown in FIG. 3, in which the main switch 112 is in an open position. For example, in response to detection of a ground fault, arc fault, short circuit, overcurrent, or other selected characteristic of current within the device, the circuit breaker device may be configured to transition the trip mechanism 114 from the closed state to the open state to electrically disconnect the load power terminal 106(2) from the line terminal 104. As one example implementation of a trip mechanism 114, FIG. 1 depicts a first lever arm 116(1) positioned proximate to the solenoid 102, a second lever arm 116(2) that engages the first lever arm 116(1), and a bracket 118 that engages the second lever arm 116(2). The bracket 118 in turn engages a trip arm 120, which is connected to the third contact 110(3) and a lever 122. The solenoid 102 may be used to apply a force to the trip mechanism 114 via the lever arm(s) 116 to transition the trip mechanism 114 from the closed state to the open state, as described with regard to FIG. 3. In some implementations, after the trip mechanism 114 has been placed in the open state, the lever 122 may be used to return the trip mechanism 114 to the closed state, such as through application of an external force by a human operator. While FIG. 1 depicts one example of a trip mechanism 114 that includes lever arms 116, a bracket 118, a trip arm 120, and a lever 122, any type of mechanical mechanism configured to separate the third contact 110(3) from the fourth contact 110(4) in response to application of a force by the solenoid 102 may be used.

A circuit board 124 within the circuit breaker device may include various components for controlling the device, detecting faults or other characteristics of current associated with the device, and so forth. For example, fault detection circuitry 126 may determine characteristics that may be indicative of a short circuit, an overcurrent fault, a ground fault, an arc fault, or other types of faults, and may generate a signal indicative of a detected fault. One or more current sensors 128 may determine characteristics associated with current in the device, such as overcurrent (e.g., current in excess of a threshold value), short circuits, current flowing through incorrect paths or locations, and so forth. The current sensor(s) 128 may generate a signal indicative of determined characteristics of the current.

In some implementations, the circuit breaker device may include one or more communication interfaces 130, such as wireless communication interfaces that may receive commands or signals from external computing devices, or other types of devices. For example, a communication interface 130 may include a Wi-Fi or Bluetooth communication interface with one or more associated antennas. In some cases, communication interfaces 130 may receive signals or commands from components of the circuit breaker device itself. Control circuitry 132 may be used to control movement of the solenoid 102, such as in response to commands received using the communication interface(s) 130, or signals determined by one or more of the fault detection circuitry 126 or current sensor(s) 128. For example, the solenoid 102 may be caused to transition the trip mechanism 114 to the open state if a signal indicative of a fault is received. As another example, the solenoid 102 may be caused to open the load switch 108 if a command to electrically disconnect the load power terminal 106(2) from the line terminal 104 is received. The solenoid 102 may be used to manipulate the load switch 108 and the main switch 112 (via the trip mechanism 114) by providing current to electrical coils within the solenoid 102 to cause an armature thereof to move. In some implementations, a flux collector 134 may also be included in series with the main switch 112. The circuit board 124 may also include various other circuit components 136 such as varistors (e.g., metal oxide varistors), capacitors, fuses, inductors, and so forth.

Figure 2:
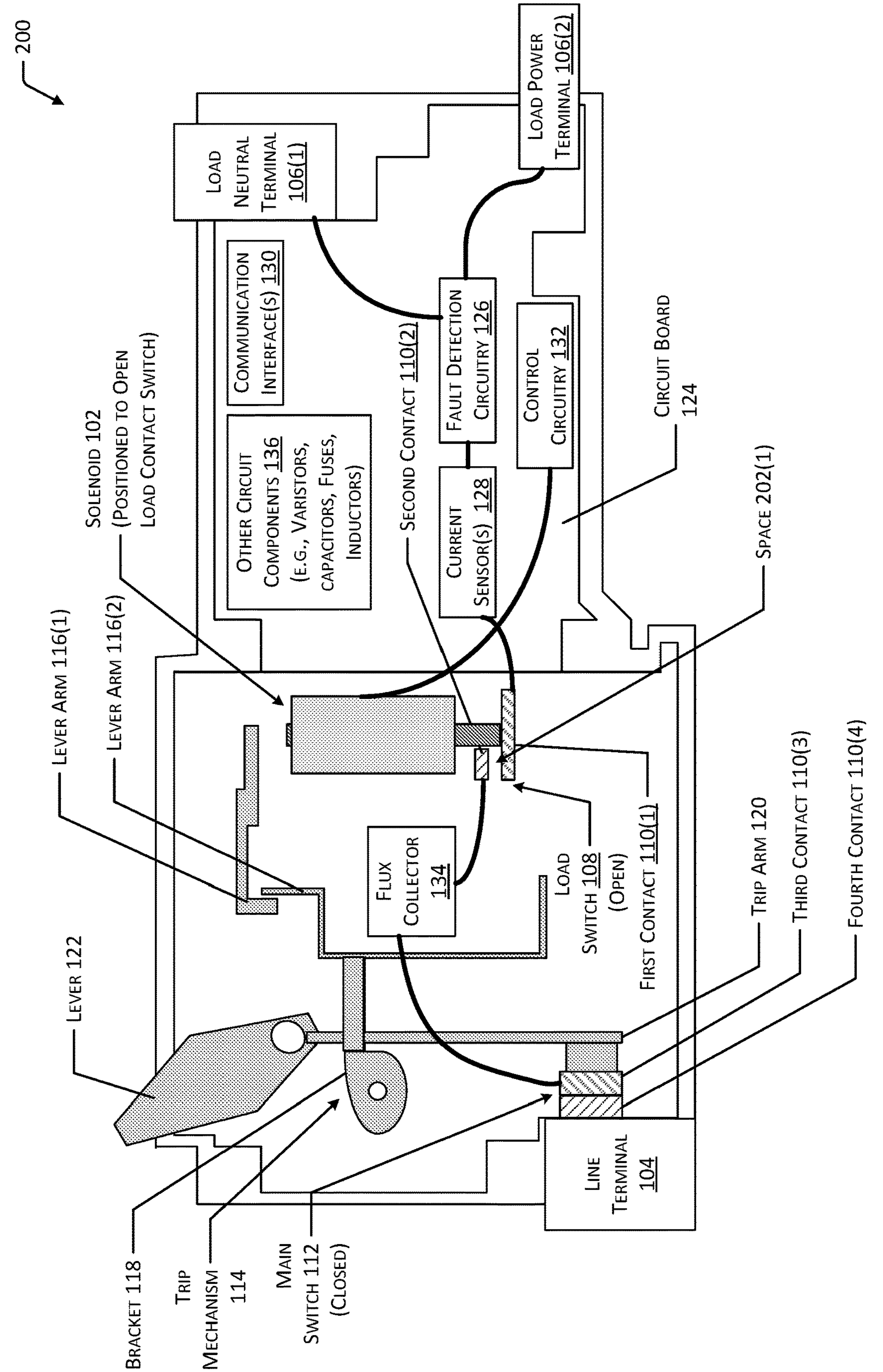
FIG. 2 is a diagram depicting the circuit breaker device of FIG. 1, with the solenoid in a first position that opens a load switch within the device.

FIG. 2 is a diagram 200 depicting the circuit breaker device of FIG. 1, with the solenoid 102 in a first position that opens a load switch 108 within the device. As described with regard to FIG. 1, the load power terminal 106(2) may be electrically disconnected from the line terminal 104 by opening one or more of the load switch 108 or the main switch 112. For example, as shown in FIG. 2, the armature of the solenoid 102 may be moved to apply a force to one of the contacts 110 associated with the load switch 108.

Continuing the example, in response to a command or signal associated with one or more of the fault detection circuitry 126, current sensor(s) 128, or communication interface(s) 130, the control circuitry 132 may cause the solenoid 102 to move toward a first position in which the armature of the solenoid 102 contacts the first contact 110(1) of the load switch 108 and applies a force thereto. In the example implementation shown in FIG. 2, the first contact 110(1) may be movable relative to the second contact 110(2), such that the armature of the solenoid 102 moves the first contact 110(1) away from the second contact 110(2), forming a space 202(1) between the contacts 110. As a result, the load switch 108 is placed in an open position and the load power terminal 106(2) is electrically disconnected from the line terminal 104.

In some implementations, the first contact 110(1) may be mechanically biased toward the second contact 110(2), such that the load switch 108 is biased toward the closed position. For example, a spring or other biasing member may apply a force to the first contact 110(1) in a direction toward the second contact 110(2). However, the position of the armature of the solenoid 102 may maintain the first contact 110(1) in a position that is spaced apart from the second contact 110(2). When the solenoid 102 is transitioned from the first position depicted in FIG. 2, the biasing force applied to the first contact 110(1) may return the load switch 108 to the closed position shown in FIG. 1. While FIG. 2 depicts an implementation in which the first contact 110(1) is movable and the armature of the solenoid 102 extends toward the first contact 110(1) to apply a pushing force, in other implementations, the second contact 110(2) may be movable, and the solenoid 102 may move in a direction away from the first contact 110(1), applying a pulling force to the second contact 110(2). In still other implementations, both the first contact 110(1) and second contact 110(2) may be movable, and the solenoid 102 may be configured to apply a force to one or both contacts 110. Additionally, in some implementations, the load switch 108 may be biased toward the open position, and the solenoid 102 may apply a force to one of the first contact 110(1) or the second contact 110(2) to move the load switch 108 to the closed position.

In some implementations, the solenoid 102 may include a latching mechanism, such as a magnet, to retain the solenoid 102 in the first position depicted in FIG. 2. For example, an electrical coil of the solenoid 102 may be energized to create a magnetic field that causes movement of the armature toward the first contact 110(1). If the first contact 110(1) is biased toward the second contact 110(2), the armature may be used to apply a force that exceeds the biasing force to maintain the load switch 108 in the open position. Use of a latching mechanism to retain the armature in the position depicted in FIG. 2 may enable the provision of power to the electrical coil of the solenoid 102 to be ceased, which may conserve power and prevent overheating of components of the circuit breaker device that may be caused by continuous application of power to the coil for an extended period of time.

To electrically reconnect the load power terminal 106(2) with the line terminal 104, an electrical coil of the solenoid 102 may be energized to apply a force to the armature that exceeds the force of the latching mechanism. Force from the magnetic field of the electrical coil and that of the biasing of the first contact 110(1) may then move the armature toward the neutral position shown in FIG. 1. In some implementations, an electrical coil of the solenoid 102 may be energized to provide a force to the armature in a direction toward the first contact 110(1) to control a rate of movement of the armature and limit movement of the armature past the neutral position shown in FIG. 1. For example, if the biasing force and the force used to remove the armature from the latching mechanism were applied to the armature in the absence of a force in the opposite direction, the armature may move past the position shown in FIG. 1 and may interact with the trip mechanism 114.

FIG. 3 is a diagram 300 depicting the circuit breaker device of FIG. 1, with the solenoid 102 in a second position that activates a trip mechanism 114 to open a main switch 112 within the device. As described with regard to FIG. 1, the load power terminal 106(2) may be electrically disconnected from the line terminal 104 by opening one or more of the load switch 108 or the main switch 112. For example, as shown in FIG. 3, the armature of the solenoid 102 may be moved to apply a force to a lever arm 116 or other portion of the trip mechanism 114 to cause the trip mechanism 114 to move to an open position that disassociates the third contact 110(3) of the main switch 112 from the fourth contact 110(4).

Continuing the example, in response to a command or a or signal associated with one or more of the fault detection circuitry 126, current sensor(s) 128, or communication interface(s) 130, the control circuitry 132 may cause the solenoid 102 to move toward a second position in which the armature of the solenoid 102 contacts the lever arm 106(1) of the trip mechanism 114 and applies a force thereto to transition the trip mechanism 114 from a closed state to an open state. In the example shown, the third contact 110(3) of the main switch 112 is connected to the trip arm 120, and movement of the trip arm 120 moves the third contact 110(3) away from the fourth contact 110(4), forming a space 202(2) between the contacts. As a result, the main switch 112 is placed in an open position and the line terminal 104 is electrically disconnected from the load power terminal 106(2).

In some implementations, the trip mechanism 114 may be mechanically biased toward the open state depicted in FIG. 3, while lever arms 116 or other mechanical elements retain the trip mechanism 114 in the closed state. When the position of the armature of the solenoid 102 applies a force to one or more portions of the trip mechanism 114, movement of the portion(s) of the trip mechanism 114 may enable the biasing force to transition the trip mechanism 114 to the open state, separating the third contact 110(3) from the fourth contact 110(4). When the solenoid 102 is transitioned from the second position depicted in FIG. 3, the main switch 112 may remain in the open position until the trip mechanism 114 is reset, such as through application of a manual force to the lever 122 by a human operator who may verify that a dangerous or undesirable condition is not present in the environment associated with the circuit breaker device prior to electrically reconnecting the line terminal 104 with the load power terminal 106(2). In some implementations, when contact with the armature of the solenoid 102 is not required to maintain the trip mechanism 114 in the open state, the armature may be biased away from the second position shown in FIG. 3. For example, the solenoid 102 may include a spring or other biasing member that applies a force to the armature in a direction opposite the second position to return the armature to the neutral position shown in FIG. 1. In some implementations, an electrical coil of the solenoid 102 may be energized to provide a force to the armature in a direction toward the lever arm 116(1) to control a rate of movement of the armature and limit movement of the armature past the neutral position shown in FIG. 1.

Figure 4:
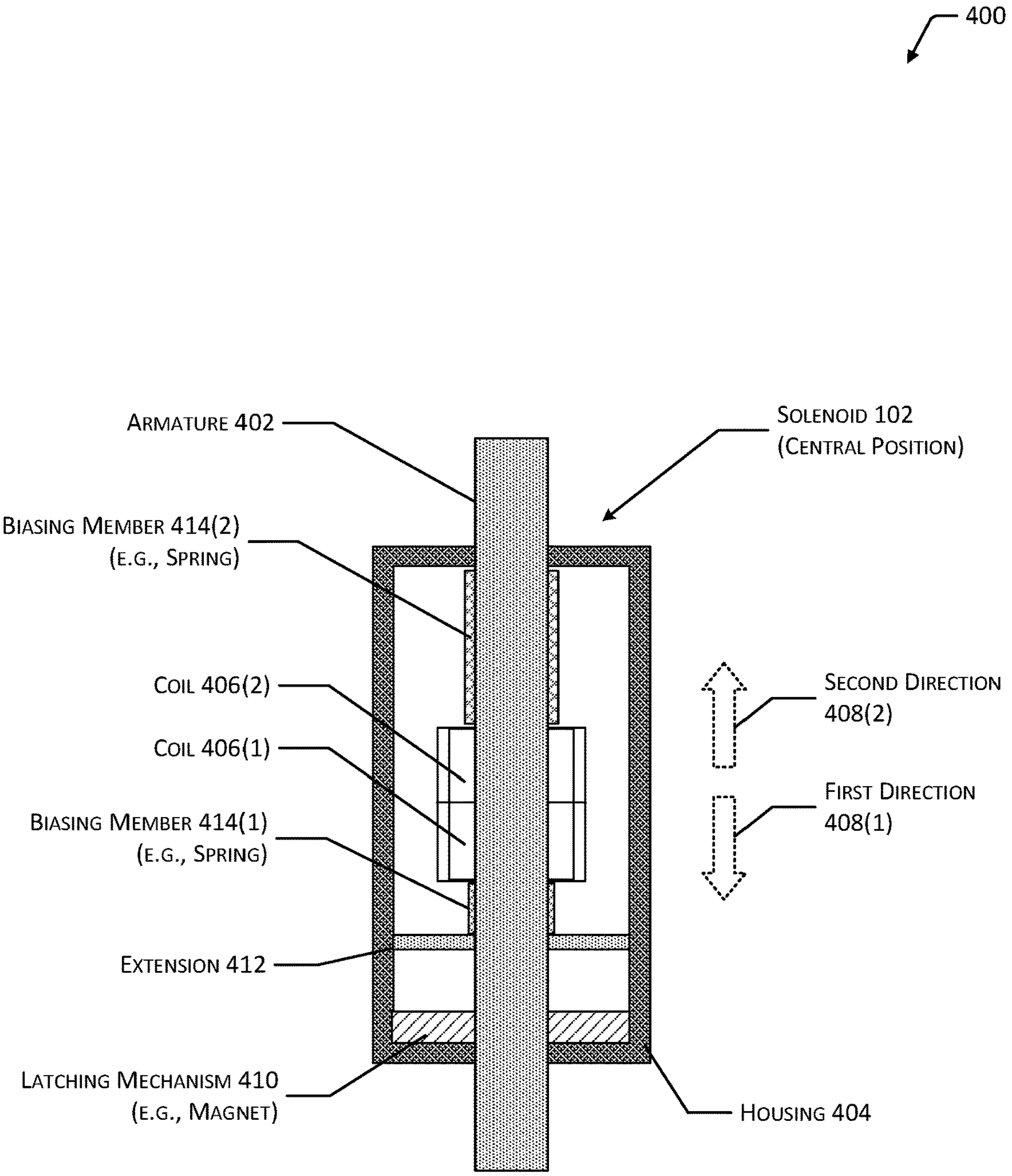
FIG. 4 is a diagram depicting an implementation of a solenoid that may be placed in three positions to control operation of switches of a circuit breaker device.

FIG. 4 is a diagram 400 depicting an implementation of a solenoid 102 that may be placed in three positions to control operation of switches of a circuit breaker device. The solenoid 102 may include an armature 402 positioned within a housing 404. As described with regard to FIGS. 1-3, the armature 402 may be movable relative to the housing 404, such that ends of the armature 402 may be moved into contact with switches or other components within a circuit breaker device. While FIG. 4 depicts the housing 404 and armature 402 as generally cylindrical components, the housing 404 and armature 402 may have any shape that permits movement of the armature 402 relative to the housing 404. Additionally, while FIG. 4 depicts the armature 402 positioned centrally within the housing 404 (e.g., along the long axis of the housing 404), the armature 402 may be positioned with any alignment or orientation relative to the housing 404 that permits movement of the armature 402 relative to the housing 404.

The solenoid 102 may include one or more electrical coils 406 positioned in association with the armature 402. For example, the armature 402 may be formed from or may include one or more portions having a material that is movable in response to electromagnetic forces. Electrical power may be provided to the coil(s) 406 to cause movement of the armature 402. For example, energizing a first electrical coil 406(1) may cause movement of the armature 402 in a first direction 408(1), from the central position shown in FIGS. 1 and 4 toward the first position shown in FIGS. 2 and 5. Energizing a second electrical coil 406(2) may cause movement of the armature in a second direction 408(2) toward the second position shown in FIGS. 3 and 6. In some implementations, both electrical coils 406 may be energized to control the rate of movement of the armature 102, such as to enable returning of the armature 102 to the central position shown in FIGS. 1 and 4 while limiting movement of the armature 102 beyond the central position.

As described previously, in some implementations, the solenoid 102 may include a latching mechanism 410, such as a magnet. In other implementations, other types of latching mechanisms 410, such as mechanical latches, a force fit or friction fit between the armature 402 and the housing 404 or another portion of the solenoid 102, and so forth may be used. After the armature 102 has moved to the first position, described with regard to FIGS. 2 and 5, due to energizing the coil 406(1), the latching mechanism 410 may retain the armature 402 in the first position while provision of electrical power to the coil 406(1) is ceased. In some cases, the armature 402 may include an extension 412 that may increase the surface area of the armature 402 that engages a magnet or other type of latching mechanism 410. To move the armature 402 from the first position to the central position or the second position, described with regard to FIGS. 3 and 6, one or both of the coils 406 may be energized to apply a force to the armature 402 that exceeds the force applied by the latching mechanism 410, to enable the armature 402 to move in the second direction 408(2). In some implementations, a spring or other type of biasing member 414(1) may limit movement of the armature 402 in the first direction 408(1), apply a biasing force in the second direction 408(2), and so forth.

Figure 6A:
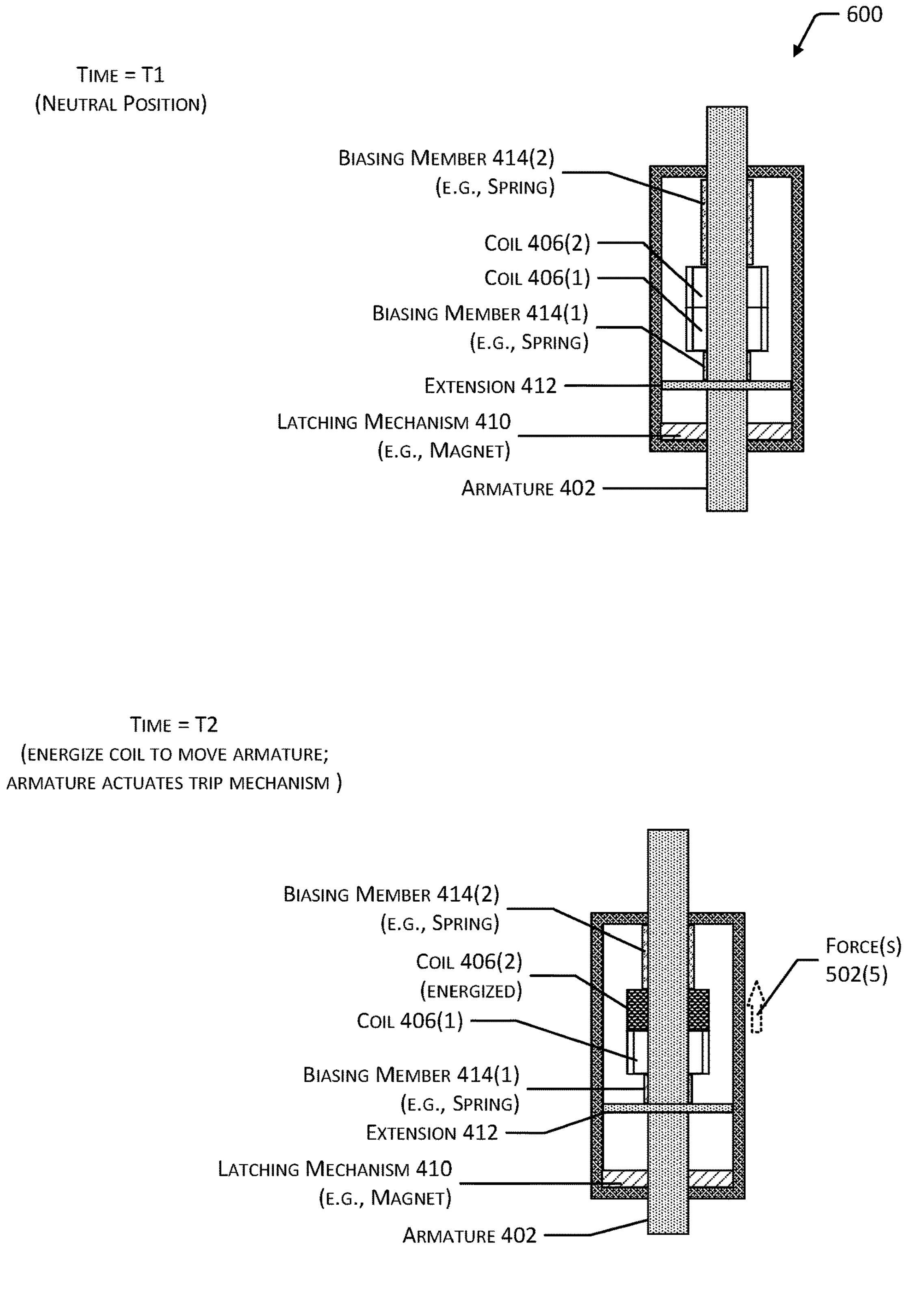
FIGS. 6A and 6B are diagrams depicting movement of the solenoid of FIG. 4 between a neutral position and a second position that may operate a switch in a circuit breaker device.
Figure 6B:
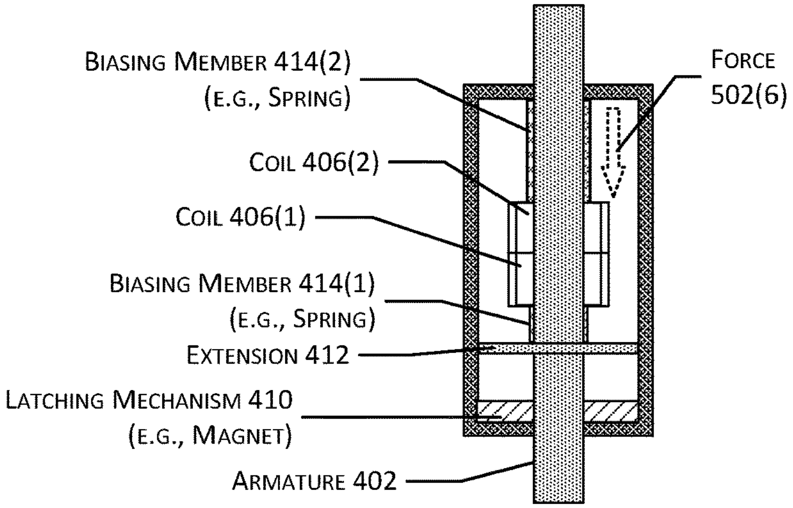
Figure 6B:
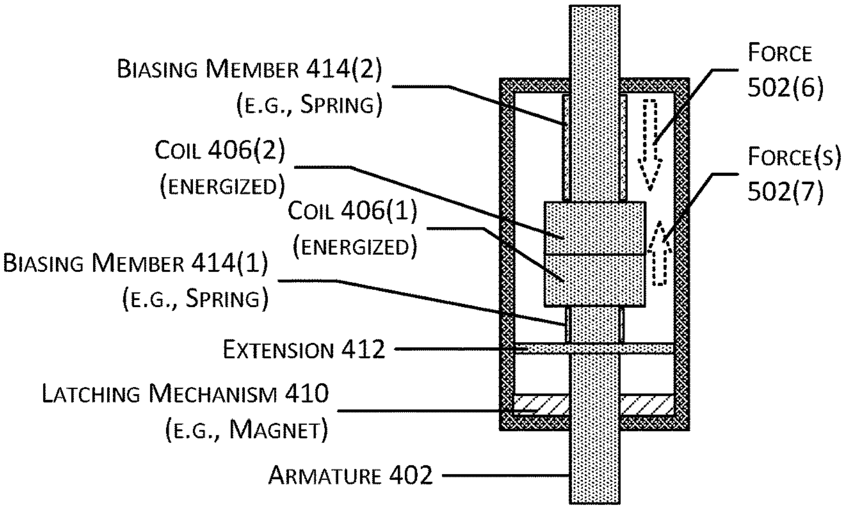

Energizing the second coil 406(2) may cause movement of the armature 402 in the second direction 408(2) toward the second position, described with regard to FIGS. 3, and 6, which may cause the armature 402 to apply a force to a portion of a trip mechanism 114. A biasing member 414(2) within the solenoid 102 may apply a biasing force to the armature 402 in the first direction 408(1). For example, if the armature 402 actuates a trip mechanism 114 retaining the armature 402 in the second position is not required to maintain a switch in an open position, the armature 402 may move toward the second direction to contact the trip mechanism 114, then return to the central position after provision of power to the coil 406(2) as ceased. In some implementations, one or both coils 406 may be energized to prevent significant movement of the armature 402 beyond the central position due to the force from the biasing member 414(1).

Figure 5A:
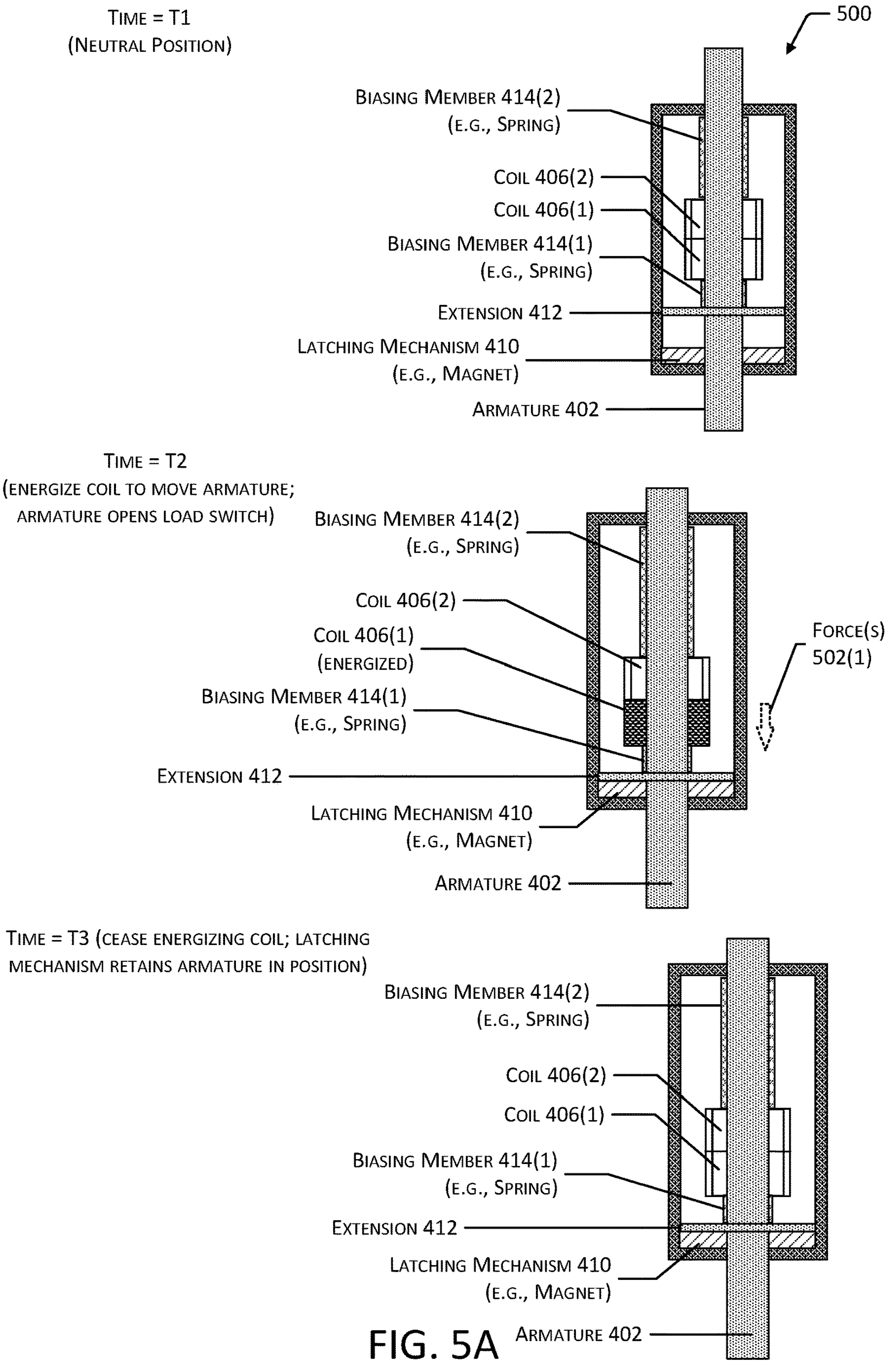
FIGS. 5A and 5B are diagrams depicting movement of the solenoid of FIG. 4 between a neutral position and a first position that may operate a switch in a circuit breaker device.
Figure 5B:
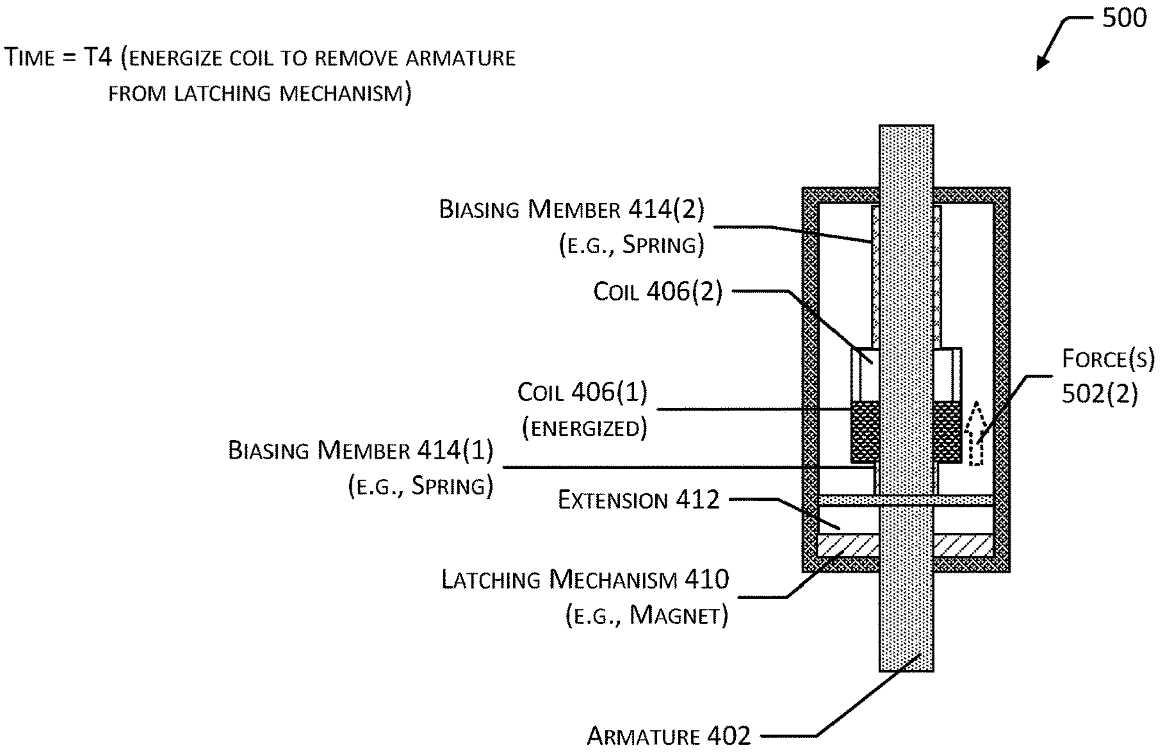
Figure 5B:
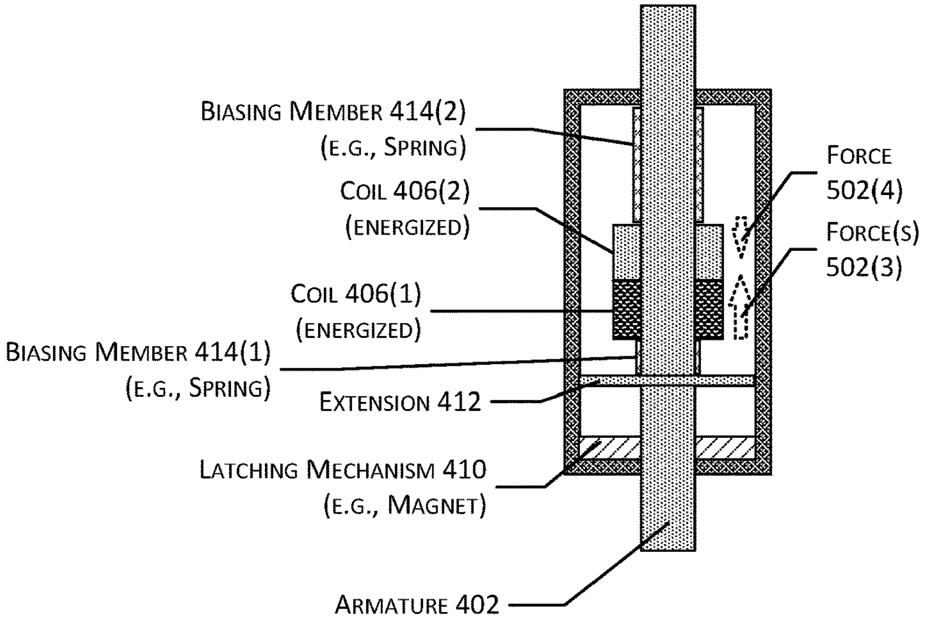

FIGS. 5A and 5B are diagrams 500 depicting movement of the solenoid 102 of FIG. 4 between a neutral position and a first position that may operate a switch in a circuit breaker device. As shown in FIG. 5A, at a first time T1, the armature 402 may be positioned in a neutral position within the housing 404 of the solenoid 102, as described with regard to FIGS. 1 and 4. When the armature 402 is in the neutral position, the armature 402 may not apply a force that controls switches within the circuit breaker device, and electrical power may flow from the line terminal 104 to the load power terminal 106(2). In other implementations, the load switch 108 may be biased toward the open position and when the armature 402 is in the neutral position, the line terminal 104 is electrically disconnected from the load power terminal 106(2).

At a second time T2 after the first time T1, an electrical coil 406(1) of the solenoid 102 may be energized to cause the armature to move 402. For example, an electromagnetic field associated with the coil 406(1) may apply a force 502(1) to the armature 402 to cause movement in the first direction 408(1). As described with regard to FIG. 2, movement of the armature 402 to this position may cause the armature 402 to apply a force to a portion of a load switch 108, such as one or more electrical contacts 110 thereof, moving one electrical contact 110 away from another electrical contact 110 to place the load switch 108 in an open position, electrically disconnecting the load power terminal 106(2) from the line terminal 104. As described previously, in other implementations, if the load switch 108 is instead biased toward the open position, the armature 402 may apply a force to move one electrical contact 110 toward another electrical contact 110 to place the load switch 108 in a closed position.

At a third time T3 after the second time T2, the latching mechanism 410 of the solenoid 102 may engage the armature 402 and retain the armature 402 in the first position while energizing of the coil 406(1) is ceased. In cases where the load switch 108 is biased toward the closed position, retaining the armature 402 in the first position may prevent the load switch 108 from moving to the closed position. In cases where the load switch 108 is biased toward the open position, retaining the armature 402 in the first position may prevent the load switch 108 from moving to the open position. The latching mechanism 410 may enable the armature 402 to be retained in this position without the consumption of energy or creation of heat caused by energizing of the coil 406(1).

As shown in FIG. 5B, to transition the armature 402 from the first position, at a fourth time T4 after the third time T3, one or more of the coils 406 of the solenoid 102 may be energized. The magnetic field associated with the coil(s) 406 may apply a force 502(2) to the armature 402 in the second direction 408(2), which may exceed the force applied to the armature 402 by the latching mechanism 410, releasing the armature 402 from the latching mechanism 410 and in some cases, moving the armature 402 away from the first position and toward the neutral position.

At a fifth time T5 after the fourth time T4, both coils 406 may be energized to limit movement of the armature 402 past the neutral position. For example, one of the electrical coils 406(1) may apply a force 502(3) to the armature 402 in the second direction 408(2) to move the armature 402 toward the neutral position. The other electrical coil 406(2) may apply a force 502(4) in the first direction 408(1) to limit the rate of movement of the armature 402 toward the neutral position. The limited rate of movement of the armature 402 may limit the distance that the armature 402 passes the neutral position, preventing the armature 402 from approaching or reaching the second position and potentially applying a force to a trip mechanism 114 in the circuit breaker device.

FIGS. 6A and 6B are diagrams 600 depicting movement of the solenoid 102 of FIG. 4 between a neutral position and a second position that may operate a switch in a circuit breaker device. As shown in FIG. 6A, at a first time T1, the armature 402 may be positioned in a neutral position within the housing 404 of the solenoid 102, as described with regard to FIGS. 1 and 4. When the armature 402 is in the neutral position, the armature 402 may not apply a force that controls switches within the circuit breaker device, and electrical power may flow from the line terminal 104 to the load power terminal 106(2).

At a second time T2 after the first time T1 an electrical coil 406(2) of the solenoid 102 may be energized to move the armature 402. For example, a magnetic field associated with the electrical coil 406(2) may apply a force 502(5) to the armature 402 to move the armature 402 in the second direction 408(2) toward the second position described with regard to FIG. 3. When the armature 402 reaches the second position, the armature 402 may apply a force to a portion of a trip mechanism 114, transitioning the trip mechanism 114 to an open state, which may separate electrical contacts in a main switch 112 and electrically disconnect the line terminal 104 from the load power terminal 106(2).

As shown in FIG. 6B, at a third time T3 after the second time T2, energizing of the coil 406(2) may be ceased, and a biasing member 414(2) within the solenoid 102 may apply a force 502(6) to the armature 402 to move the armature 402 away from the second position 408(2) and toward the neutral position. In other implementations, one or both of the electrical coils 406 may be energized to apply one or more forces 502 to the armature 402 in the first direction 408(1) in addition to or in place of use of the biasing member 414(2). Because the trip mechanism 114 is not biased toward moving the main switch 112 to the closed position, retaining the armature 102 in the second position is not necessary, and the main switch 112 may remain in the open position while the armature 402 moves toward the neutral position.

At a fourth time T4 after the third time T3, one or both of the coils 406 may be energized to limit movement of the armature 402 past the neutral position. For example, the biasing member 414(2) may apply a force 502(6) to the armature 402 in the first direction 408(1) that may cause the armature 402 to pass the neutral position in the absence of an additional force 502(7) in the second direction 408(2) applied by the coil(s) 406. Use of the coil(s) 406 in combination with the biasing member 414 may limit the rate of movement of the armature 402 toward the neutral position. The limited rate of movement of the armature 402 may limit the distance that the armature 402 passes the neutral position, preventing the armature 402 from approaching or reaching the first position and potentially applying a force to a contact 110 of the load switch 108 within the circuit breaker device. In other implementations, a coil 106 may be used to apply a force 502 in the first direction 408(1) in addition to or in place of the biasing member 414 (\21).

While the device describes the use of a solenoid 102, in other implementations other actuators having a movable element that is usable to apply a force to a contact of the load switch 108 or main switch 112 may be used. For example, a linear motor may be used in place of the solenoid 102. In another example a rack and pinion arrangement may be used with a rotary motor driving the rack. In yet another example a rotary motor may operate a cam that operates the main switch 112 or the load switch 108. In still other implementations, an electromagnet or a shape memory alloy that changes shape in response to temperature may be used to operate the main switch 112 and the load switch 108. For example, one or more contacts of the load switch 108 or main switch 112 may include a ferrous metal piece or permanent magnet with opposing polarities. An electromagnet may be energized using selected currents to push or pull the contacts of one or both switches. One or more shape memory alloys may have a shape, such as a coil, that expands from a first state to a second state that applies a force to one or more contacts to open or close the load switch 108 or main switch 112. In some cases, multiple shape memory alloys may be used to move a contact in different directions or apply forces to different contacts.

Figure 7:
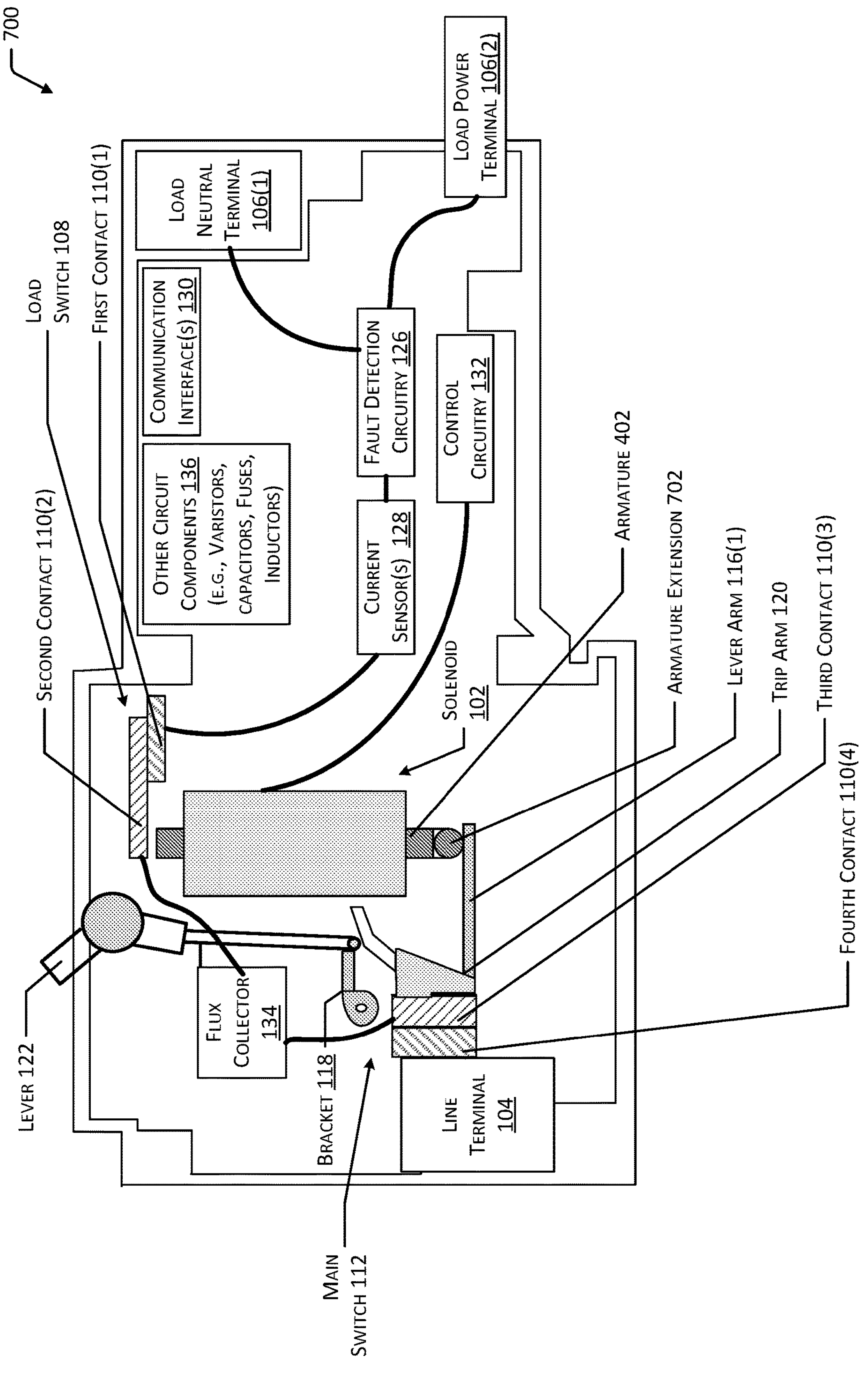
FIG. 7 is a diagram depicting an implementation of a circuit breaker device having an alternate configuration of elements than the configuration presented in the implementation shown in FIG. 1.

FIG. 7 is a diagram 700 depicting an implementation of a circuit breaker device having an alternate configuration of elements than the configuration presented in the implementation shown in FIG. 1. For example, FIG. 7 depicts an implementation in which a load switch 108 having a first contact 110(1) connected to the load power terminal 106(2) and a second contact 110(2) connected to the main switch 112 is positioned adjacent to a first end of the armature 402 of the solenoid 102. Extension of the armature 402 from the solenoid 102 may contact and displace the second contact 110(2) (rather than the first contact 110(1) as shown in the implementation of FIG. 1) to open the load switch 108 and electrically disconnect the line terminal 104 from the load power terminal 106(2). The opposite end of the armature 402 may include an armature extension 702 that may extend outward from the armature 402 to contact other components of the circuit breaker device, such as a lever arm 116 of a trip mechanism 114. For example, if the trip mechanism 114 is not positioned directly in alignment with the long axis of the armature 402, the armature extension 702 may contact a lever arm 116 or other portion of the trip mechanism 114 to place the trip mechanism 114 in an open state to open the main switch 112 and electrically disconnect the line terminal 104 from the load terminal(s) 106.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A circuit breaker device comprising:
- a line terminal configured to connect to a power source;
- a load terminal configured to connect to a load;
- a first switch comprising:
  - a first contact connected to the load terminal; and
  - a second contact;
  - wherein the first contact is movable relative to the second contact and is biased toward the second contact to maintain contact with the first contact to connect the load terminal to the line terminal;
- a second switch comprising:
  - a third contact connected to the second contact of the first switch;
  - a fourth contact connected to the line terminal; and
  - a trip mechanism configured to move the third contact between:
    - a closed position in which the third contact is in contact with the fourth contact, and
    - an open position in which the third contact is separated from the fourth contact;
- a solenoid comprising an armature with a first end and a second end, wherein the armature is movable between:
  - a first position in which the first end of the armature moves the first contact away from the second contact to disconnect the load terminal from the line terminal,
  - a second position in which the second end of the armature causes the trip mechanism to move from the closed position to the open position to disconnect the load terminal from the line terminal, and
  - a third position between the first position and the second position;
- one or more sensors configured to generate a signal in response to one or more of a ground fault, an arc fault, a short circuit, or a current that exceeds a threshold;
- a communication interface configured to receive a command from one or more of: a computing device or the one or more sensors; and
- control circuitry to one or more of:
  - cause the solenoid to move toward the first position in response to the command; or
  - cause the solenoid to move toward the second position in response to the signal.

2. The circuit breaker device of claim 1, wherein the solenoid further comprises:

an electrical coil, wherein application of current to the electrical coil causes movement of the armature toward the first position; and a latching mechanism that retains the solenoid in the first position in an absence of the application of current to the electrical coil.

3. The circuit breaker device of claim 1, wherein the solenoid further comprises:

a first electrical coil, wherein application of a first current to the first electrical coil causes movement of the armature toward one of the first position or the second position; and a second electrical coil wherein application of a second current to the second electrical coil causes movement of the armature toward the other of the first position or the second position;

wherein the application of the first current concurrently with the application of the second current causes movement of the solenoid toward the third position.

4. A device comprising:

a first switch comprising:

a first contact connected to a first terminal; and a second contact;

a second switch comprising:

a third contact connected to the second contact;

a fourth contact connected to a second terminal; and a trip mechanism;

an actuator having a movable element that is movable between:

a first position in which a first end of the movable element causes movement of one of the first contact or the second contact away from the other of the first contact or the second contact to disconnect the first terminal from the second terminal;

a second position in which a second end of the movable element causes the trip mechanism to move the third contact or the fourth contact away from the other of the third contact or the fourth contact to disconnect the first terminal from the second terminal; and a third position between the first position and the second position; and control circuitry to cause movement of the moveable element of the actuator towards the first position responsive to a command or towards the second position responsive to a signal.

5. The device of claim 4, wherein the actuator comprises a solenoid, the movable element of the actuator comprises an armature of the solenoid, and the solenoid comprises a latching mechanism that retains the armature in the first position.

6. The device of claim 5, wherein:

the solenoid further comprises an electrical coil;

at a first time, the control circuitry causes application of a first current to the electrical coil to move the armature toward the first position; and the latching mechanism retains the armature in the first position in an absence of the application of the first current to the electrical coil.

7. The device of claim 6, wherein at a second time after the first time, the control circuitry causes application of a second current to the electrical coil to apply a first force to the armature that is greater than a second force associated with the latching mechanism, the second force to cause movement of the armature toward the third position.

8. The device of claim 5, wherein the latching mechanism comprises a magnet.

9. The device of claim 4, further comprising:

a communication interface that is in communication with one or more of:

detection circuitry associated with the device; or a computing device external to the device;

wherein in response to the command from the one or more of the detection circuitry or the computing device, the control circuitry causes movement of the movable element of the actuator toward the first position.

10. The device of claim 4, wherein:

the trip mechanism is associated with the third contact, the trip mechanism is movable between:

a closed position in which the third contact is in contact with the fourth contact, and an open position in which the third contact is separated from the fourth contact; and movement of the movable element of the actuator toward the second position causes the trip mechanism to move from the closed position to the open position.

11. The device of claim 4, further comprising:

detection circuitry that generates the signal in response to one or more characteristics of current associated with the first terminal;

wherein in response to the signal from the detection circuitry, the control circuitry causes movement of the movable element of the actuator toward the second position.

12. The device of claim 4, further comprising a biasing member that applies a force to move the movable element of the actuator from the second position toward the third position.

13. The device of claim 4, wherein the actuator comprises a solenoid, the movable element of the actuator comprises an armature of the solenoid, and the solenoid comprises:

a first electrical coil, wherein application of a first current to the first electrical coil causes movement of the armature toward one of the first position or the second position; and a second electrical coil, wherein application of a second current to the second electrical coil causes movement of the armature toward the other of the first position or the second position;

wherein the application of the first current concurrently with the application of the second current causes movement of the armature toward the third position.

14. A method comprising:

providing electrical power from a power source to a load, wherein the electrical power is conducted through circuitry associated with a circuit breaker device, and wherein the circuit breaker device comprises:

a first switch comprising:

a first contact connected to a first terminal associated with the power source, and a second contact; and a second switch comprising:

a third contact connected to the second contact, and a fourth contact connected to a second terminal associated with the load; and an actuator having a movable element that is movable between:

a first position in which a first end of the moveable element causes movement of the first contact away from the second contact to electrically disconnect the first terminal from the second terminal;

a second position in which a second end of the moveable element causes movement of the third contact away from the fourth contact to electrically disconnect the first terminal from the second terminal; and a third position between the first position and the second position; and providing a signal to the actuator to cause movement of the movable element from the third position to one of the first position or the second position to prevent flow of electrical power from the power source to the load.

15. The method of claim 14, wherein the actuator comprises a solenoid, the movable element of the actuator comprises an armature of the solenoid, and the providing the signal comprises:

applying a first current to a first electrical coil of the solenoid to cause movement of the armature toward the first position;

retaining the armature in the first position using a latching mechanism of the solenoid; and ceasing application of the first current to the first electrical coil, wherein the latching mechanism retains the armature in the first position in an absence of the first current.

16. The method of claim 15, further comprising:

applying a second current to the first electrical coil to cause disengagement of the armature from the latching mechanism and movement of the armature toward the third position; and applying a third current to a second electrical coil of the solenoid concurrently with application of the second current, wherein application of the third current applies a force to the armature away from the third position to reduce a rate of movement of the armature toward the third position.

17. The method of claim 14, wherein the actuator comprises a solenoid, the movable element of the actuator comprises an armature of the solenoid, and the providing the signal comprises:

applying a first current to a first electrical coil of the solenoid to cause movement of the armature toward the second position;

wherein the movement of the armature toward the second position disengages a trip mechanism associated with the third contact, and wherein disengagement of the trip mechanism separates the third contact from the fourth contact.

18. The method of claim 17, further comprising:

ceasing application of the first current to the first electrical coil, wherein a biasing member of the solenoid moves the armature in a first direction away from the second position; and applying a second current to a second electrical coil of the solenoid, wherein application of the second current applies a force to the armature toward the second position to reduce a rate of movement of the solenoid toward the third position.

19. The method of claim 17, further comprising:

applying a second current to a second electrical coil of the solenoid concurrently with application of the first current, wherein application of the second current causes movement of the armature toward the third position and application of the first current reduces a rate of movement of the solenoid toward the third position.

20. The method of claim 14, further comprising:

providing a command to a communication interface of the circuit breaker device, wherein the signal is provided to the movable element of the actuator in response to the command provided to the communication interface.

* * * * *